United States Patent [19]

Cooper

[11] 3,998,285
[45] Dec. 21, 1976

[54] VEHICLE PARKING GUIDE

[76] Inventor: Stephen Robert Cooper, 246 Sunrise Hill Court, Norwalk, Conn. 06851

[22] Filed: Sept. 22, 1975

[21] Appl. No.: 615,233

[52] U.S. Cl. .......................... 180/1 AP; 116/28 R; 280/762

[51] Int. Cl.² .................................................. B60K

[58] Field of Search .......... 116/28 R, 35 R; 33/264; 340/87, 91, 102; 240/7.1 F, 7.1 C, 8.3; 180/1 A, 1 AP; 224/24.03 R, 24.03 A; 280/762, 769

[56] References Cited

UNITED STATES PATENTS

| | | | |
|---|---|---|---|
| 1,572,603 | 2/1928 | Heide | 180/1 AP X |
| 1,969,144 | 8/1934 | Mozur | 340/87 |
| 2,143,997 | 1/1939 | Parkinson | 33/264 |
| 2,927,310 | 3/1960 | Knapp | 116/28 R |
| 3,487,359 | 12/1969 | McClintock | 340/87 |
| 3,520,273 | 7/1970 | Daifotes | 116/28 R |
| 3,606,385 | 9/1971 | Johannes | 224/42.03 A X |
| 3,788,268 | 1/1974 | Hiatt et al. | 116/28 R |
| 3,858,924 | 1/1975 | Bores | 116/28 R |
| 3,889,384 | 6/1975 | White | 116/28 R X |
| 3,905,435 | 9/1975 | Coronado | 180/1 AP |

*Primary Examiner*—Richard C. Queisser
*Assistant Examiner*—Daniel M. Yasich
*Attorney, Agent, or Firm*—Gottlieb, Rackman, Reisman & Kirsch

[57] ABSTRACT

There is disclosed a vehicle indicating mechanism, in the form of a parking guide, for gauging the back clearance of an automobile or similar vehicle. The parking guide includes a hollow, translucent guide rod, which is movable responsive to a motor within a control box, from a substantially horizontal position, adjacent to the back bumper of the vehicle, to a substantially vertical position, extending upwardly from the corner of the bumper. The guide rod is illuminated by a light within the control box when the rod is in the vertical position, thereby also enabling the rod to be viewed by the driver and used as a guide for parking the automobile, at night.

16 Claims, 6 Drawing Figures

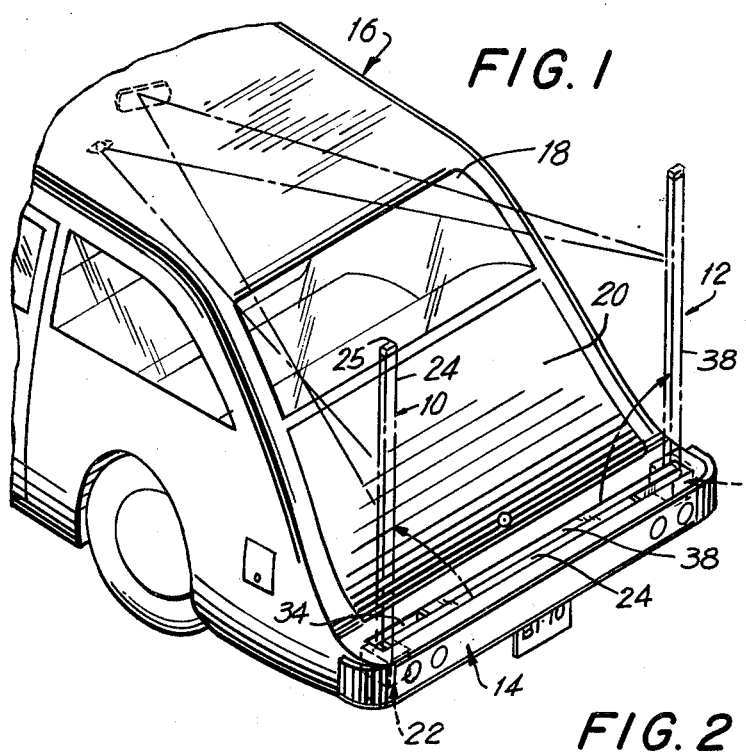
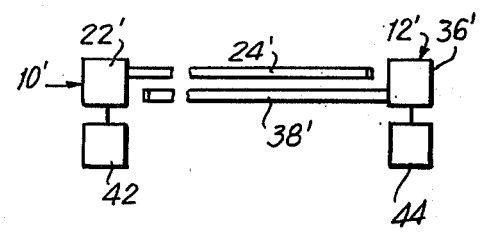
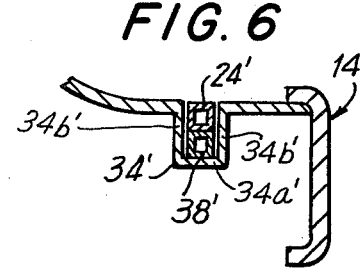
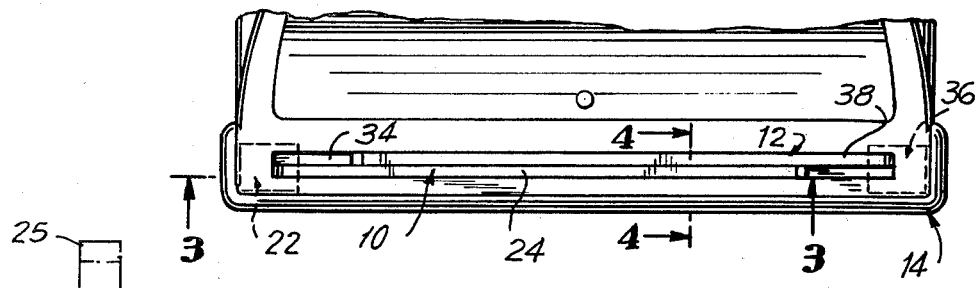
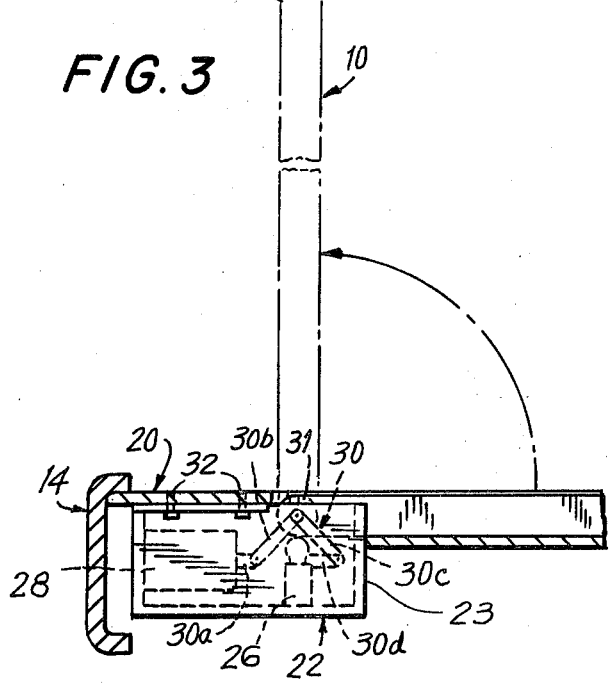
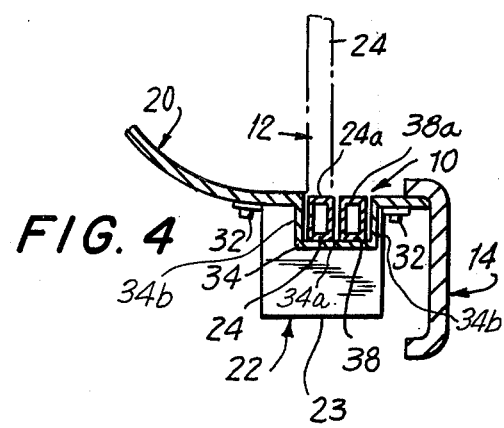
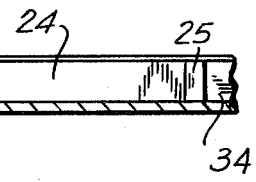

VEHICLE PARKING GUIDE

The present invention relates generally to indicating mechanisms and, more specifically, to a vehicle indicating mechanism in the form of a parking guide particularly useful in gauging the rear of the vehicle when the vehicle is being parallel parked.

Over the last several years, it has been found that the general configuration of automotive vehicles, particularly passenger automobiles, has changed considerably. Specifically, many of today's automobiles have been designed with the "fastback" look. This look is characterized by the fact that the rear hood or "trunk" of the automobile, as well as the rear window, is slanted downwardly, towards the rear bumper. It is believed that this trend in design will continue, with more and more automobile designers adopting this general shape, since it has been found that this shape is aerodynamically efficient, especially when the automobile is driven at high speeds. The slanting back or "fastback" design has been found to reduce aerodynamic drag, resulting in better gasoline consumption when the vehicle is driven at these speeds.

However, one problem that has arisen with such designs is the increased difficulty in gauging the back of the automobile. Thus, before the fastback design was adopted, the driver could gauge the back of the automobile by looking out of the rear window, either directly or by using the rear-view mirror, and he could approximate the rear of the automobile by viewing the back of the rear hood or "trunk" which, as a general rule in these designs, terminated approximately at the rear bumper or at the rear most portion of the automobile. However, in fastback designs, since the rear hood or trunk is sloped towards the bumper, this technique cannot be used and it is very difficult for the driver to look out of the rear window, either directly or using the rear view mirror, and determine the back extremity of the automobile. This becomes a rather acute problem in parallel parking, where the automobile most often be backed into a parking space between two already parked vehicles. If the driver is unable to gauge the back of the automobile, he may well back into the vehicle behind him, resulting in damage to either, or both, of the vehicles.

In order to overcome this difficulty, various parking guides for automobiles have been proposed. Some of these parking guides utilize a telescoping guide rod, disposed near the rear bumper of the automobile. When the vehicle is to be parked, the rod is raised and this provides the driver with some guide in parking the vehicle. Other of these parking guides utilize a detachable rod which may be attached near the rear bumper of the vehicle. Still other types of parking guides may be provided with an indicating light, usually located at the end of the rod. This enables the parking guides to be used when the vehicle is being parked at night.

Although these prior art parking guides provide decided advantages over parking the vehicle "blind", i.e., without any parking guides whatsoever, they have, nonetheless, not been entirely satisfactory. Specifically, the use of parking guides utilizing telescoping rods has been less than satisfactory since these guides are expensive to manufacture and, since they consist of several movable parts, are rather difficult and slow to operate and are subject to many malfunctions. Parking guides utilizing detachable guide rods have also been found to be less than satisfactory since these guides seriously detract from the automobile's appearance and, since this type of guide is often located on the top of the rear-bumper of the vehicle, they are unprotected and often prone to damage resulting in faulty operation and costly repairs. Such guides may also be difficult to mount on the automobile. Still further, both of these parking guides have been found to be less than satisfactory when used at night since, although they each may include "lights" at the ends of the guide rods, these lights, which are rather small to begin with, appear to "float" in the air in the darkness and it is difficult to utilize these parking guides when the automobile is being parked at night.

Accordingly, it is a broad object of the present invention to provide a parking guide which overcomes the disadvantages of parking guides of the prior art.

Another object of this invention is to provide a parking guide which is adapted to fit adjacent the bumper of an automobile, thereby protecting the guide from damage when not in use.

Yet another object of this invention is to provide a parking guide which is adapted to fit adjacent the bumper of an automobile, thereby enabling the guide to be concealed so as not to detract from the aesthetics of the automobile.

Yet a further object of this invention is to provide a parking guide which provides improved operation when the guide is used at night.

A still further object of the present invention is to provide a parking guide which is relatively inexpensive to manufacture, which includes relatively few moving parts, and which is satisfactory in operation.

These and other objects of the present invention are accomplished by providing a parking guide for gauging the back of a vehicle including a hollow, translucent guide rod which is movable from a substantially horizontal position, adjacent and behind the back bumper of the vehicle, to a substantially vertical position, extending upwardly near the corner of the bumper. A control box, also disposed behind the rear bumper, has a motor which is provided for moving the guide rod from its horizontal position to its vertical position and back again. Substantially the entire length of the guide rod is illuminated by a source of light which is located within the control box and which is turned on when the guide rod is in the vertical position. According to one embodiment, two guide rods and two control boxes are provided, one near each end of the rear bumper, so that the guide rods rest net to each other, in a substantially horizontal plane, within a well formed at the rear of the vehicle between the bumper and the trunk. In another embodiment, two guide rods and two control boxes are provided, one near each end of the rear bumper, with one rod and one control box off-set and above the other, so that the two guide rods rest one on top of the other, in a substantially vertical plane, within the well.

The above brief description of the present invention, as well as further objects, features and advantages thereof, will become apparent upon consideration of the following detailed description of two preferred, but nonetheless illustrative, embodiments of the present invention, when taken in conjunction with the following drawings, wherein:

FIG. 1 is a rear perspective view showing two parking guides according to the present invention, disposed adjacent the rear bumper of an automobile;

FIG. 2 is a top view of the rear bumper of the automobile shown in FIG. 1 and further showing the parking guides according to the present invention;

FIG. 3 is a partial sectional view, enlarged in scale, taken substantially along the line 3—3 of FIG. 2;

FIG. 4 is a partial sectional view, enlarged in scale, taken substantially along the line 4—4 of FIG. 2;

FIG. 5 is a schematic view showing an alternative embodiment of two parking guides according to the present invention; and FIG. 6 is a sectional view similar to that of FIG. 4 but showing the alternative embodiment of FIG. 5.

Referring now to the drawings and, more particularly, to FIGS. 1-4 thereof, two parking guides 10 and 12, according to the present invention, are shown disposed adjacent the back or rear bumper 14 of an automobile 16. It will be appreciated that although the parking guides according to the present invention have utility in automobiles and other vehicles of all types, the invention is particularly useful in an automobile of the type shown in FIG. 1. Specifically, the parking guides 10 and 12 are particularly useful in an aerodynamically designed automobile of the "fastback" type, that is, an automobile having a downwardly slanting rear window 18 and rear hood or trunk 20. This is because it is particularly difficult for the driver to gauge the rear of the automobile, i.e., the location of back bumper 14, in automobiles of this type, especially when the automobile is being parallel parked.

Parking guide 10 includes a control box, generally indicated at 22, which is provided to control the movement of a translucent, hollow guide rod 24 formed of a resilient plastic or similar material. The control box, which is responsive to appropriate controls located within the automobile, is provided to move the guide rod from a substantially horizontal position, illustrated in solid line in FIGS. 1 to 3, to a substantially vertical or upstanding position, illustrated in broken line in FIGS. 1 and 3. Preferably, the guide rod is rectangular in shape (see FIG. 4) with the wide face facing the driver when the rod is raised. This enables the rod to be easily viewed by the driver and yet saves space when the rod is in its down or horizontal position. The guide rod may also have a top cap 25 which not only acts as a cover for the rod, but also, as explained hereinafter, is of a reflective material or has a reflective surface facing the control box so that light from the control box is reflected back along the length of the rod to illuminate it.

As shown in FIG. 3, the control box 22 includes a housing 23 which houses a light 26, a motor 28 and a linkage assembly 30. The guide rod is moved from its horizontal position to its vertical position and back again by motor 28 which, via linkage 30, not only moves the rod between its two positions, but also serves to turn on and off light 26, so that the light is on only when the guide rod is in its vertical position. The motor 28 is responsive to appropriate controls located within the automobile, which controls are operated by the driver of the vehicle to raise and lower the guide rod.

Specifically, when motor 28 is activated, it moves link 30a to the right (when viewed in FIG. 3). Link 30a is pivotally connected to link 30b and the other end of link 30b is connected to a wheel 31 in a manner wherein movement of link 30a to the right causes wheel 31 to move 90° counter-clockwise, i.e., link 30b may be fixed to wheel 31 and offset from the center thereof so that movement of link 30b turns the wheel. By connecting wheel 31 to guide 24, the wheel can raise and lower the guide. Light 26 may be turned on when the rod is raised by links 30c and 30d. Thus, rotation of wheel 31 counter-clockwise moves link 30c which, in turn, causes link 30d to move to the right (when viewed in FIG. 3). This movement of link 30d may cause a spring loaded switch for the light (not shown) to spring open to turn the light on. In lowering the guide rod and in turning off the light, the process is reversed. Thus, link 30a is caused to move to the left causing wheel 31 to rotate clockwise lowering the rod. This also causes link 30d to move to the left, turning off the light by deactivating the light switch.

The control box 22 of parking guide 10 is disposed behind the rear bumper 14 of automobile 16, for example, near the left, rear-most corner of the automobile, so that when the guide rod 24 is raised to its vertical position, the rod provides an indication of the rear-most left (or driver's side) corner of the automobile. Thus, control box 22 is secured to the substantially horizontal portion of rear hood 20, that is, to the portion of hood 20 which is behind and adjacent to the rear bumper, with the control box near the left, back corner of the automobile. As shown in FIGS. 3 and 4, the control box may be secured to this portion of hood 20 by appropriate fastening elements, for example, by bolts or screws 32, which attach housing 23 to the hood. It will be appreciated that mounting the control box behind the rear bumper and below the rear hood protects the control mechanism from damage and also keeps it out of view, thereby not detracting from the aesthetics of the automobile.

As indicated particularly in FIG. 4, the control box 22 is mounted behind the rear bumper so that guide 24 rests, when the rod is in its horizontal position, in a well 34 which is defined within the rear hood 20 and which runs along substantially the entire length of rear bumper 14. As also indicated in FIG. 4, well 34 is generally rectangular in cross-section and includes a bottom wall 34a, and two parallel side walls 34b which are upstanding from the bottom wall. The well is open at the top, so that the guide rod 24 may be readily raised and lowered from the well. Well 34 is sized so that when guide rod 24 is in its horizontal position, the rod rests within the well, with the upper face 24a of the rod resting substantially flush with hood 20 i.e., so that the upper face of the rod does not extend above the side walls 34b of the well.

Companion parking guide 12 is substantially identical in construction with parking guide 10 already described. Thus, parking guide 12 includes a control box 36 which is adapted to move a translucent, hollow guide rod 38 from a substantially horizontal position, hidden behind rear bumper 14 in well 34, to a substantially vertical position, illustrated in dashed line in FIG. 1. In the vertical position, a source of light within the control box is activated to illuminate the rod so that it may be viewed by the driver to provide an accurate gauge as to the right (or passenger side) rear corner of the automobile.

As illustrated in FIGS. 1, 2 and 4 of the drawings, parking guide 12 is disposed behind rear bumper 14 so that when in well 34, guide rod 38 is next to guide rod 24 of parking guide 10, that is, the upper faces of each of the guide rods are in a substantially common and horizontal plane when the rods are in their inoperative or horizontal positions. As indicated in FIG. 4, the upper face 38a of guide rod 38, when the rod is in its horizontal position within well 34, is flush upper face 24a of guide rod 24, and both such faces are level with hood 20 i.e., neither rod extends above the side walls 34b of the well.

FIGS. 5 and 6 illustrate two companion parking guides according to another embodiment of the present invention. In this embodiment, parking guide 10' and parking guide 12' are mounted behind rear bumper 14 such that the two guide rods 24' and 38' are "layered," in well 34, as shown in FIG. 6. This enables the two parking guides to rest one on top of the other, thereby taking up less horizontal space behind the rear bumper 14. In other words, parking guides 10' and 12' are off-set one from the other and "stacked" to provide a compact configuration behind bumper 14. Thus, rod 38' rests on bottom wall 34a' of well 34', while rod 24' extends no higher than the parallel side walls 34b' of the well.

In order to coordinate the raising and lowering of guide rods 24' and 38' into well 34, appropriate delay mechanisms 42 and 44 are provided. The delay mechanism 44 provides a delay when guide rod 38' is raised, thereby allowing guide rod 24' to first move out of well 34. On the other hand, delay mechanism 42 is provided to delay the lowering of guide rod 24' into well 34 so that guide rod 38' can be lowered into well 34 without interference from guide rod 24'. Thus, the two delay mechanisms 42 and 44 (which may be disposed, if desired, within respective control boxes 22' and 36') insure proper coordination between the parking guides when the guide rods are raised and lowered.

Having described the structure of the parking guides according to the present invention, a brief description of their operation will now follow.

In operation, parking guide 10 (or 10') is mounted with its control box near the rear, left hand corner of automobile 16 so that when guide rod 24 (or 24') is raised, the driver can use the rod to gauge this corner of the automobile. Similarly, parking guide 12 (or 12') is mounted with its control box near the rear, right hand corner of the automobile, so that its guide rod 38 (or 38') provides a gauge of this part of the automobile. In one embodiment, the two parking guides are mounted next to each other, so that the guide rods are substantially horizontal and with their upper faces in a common plane within well 34. In the alternative embodiment, the two parking guides are offset or "stacked" so that the two guide rods are within well 34 in a common, but substantially vertical, plane.

The parking guides of the present invention are particularly useful in gauging the back of the automobile, when the automobile is being parallel parked. Specifically, when the driver of the automobile is ready to back into a parking spot, he activates appropriate controls within the automobile which function to cause the control boxes to raise the hollow guide rods 24 (or 24') and 38 (or 38') from well 34. He may then use these rods, which are now illuminated by light 26, to gauge the back of the vehicle. Light 26 coacts with the top reflective cover 25 of the rod to fully illuminate substantially the entire length of the rod. Further, since the guide rods are of a resilient material, they are rugged and are not likely to be damaged. After the vehicle has been "parked," the controls are operated to shut off the light and to cause the control boxes to lower the guide rods, so that they return to their horizontal positions within well 34. When not in use, the parking guides are kept out of the way, protected from damage and not detracting from the appearance of the automobile. Still further, since guide rods 24 and 38 (or guide rod 24') are flush with hood 20 when not in use, this further provides a "sleek" appearance for the parking guides.

Although the invention has been described with reference to particular embodiments, it is to be understood that these embodiments are merely illustrative of the application of the principles of the present invention. For example, the guide rods 24 (or 24') and 38 (or 38') if so desired, may be selectively illuminated by the source of light only at night or the light source may be flashed on and off to provide an emergency signal when the guide rods are in their vertical positions. Still further, although the parking guides have been shown as mounted within a well 34 which is formed between the rear hood 20 and bumper 14, it will be appreciated that other ways of mounting the parking guides within a well may be provided. Specifically, the parking guides may be attached directly to the rear bumper, in which cases the bumper should be formed with an appropriate slit or well at the top thereof. Similarly, and particularly where the parking guides are to be used with existing automobiles, the parking guides may be mounted by using a separate "well panel", which may be attached between the hood and the back of the rear bumper.

Furthermore, guide rods 24 (or 24') and 38 (or 38') may also be wired with electric heating filaments in order to melt ice or snow which may accumulate when the guide rods are in a horizontal position. These heating filaments could be activated by or coordinated with the vehicle's heating or defogging systems.

Thus, it is to be understood that numerous modifications may be made in the illustrative embodiments of the present invention and other arrangements may be devised, without departing from the spirit and scope of the invention, as set forth in the following claims.

What I claim is:

1. A parking guide for gauging the back of a vehicle comprising a guide rod, a well formed between the rear bumper of the vehicle and the trunk of the vehicle to pivotally receive said guide rod, said well open at the top thereof and including a bottom wall and side walls upstanding therefrom, and means connected to the pivotal guide rod for moving said guide rod in a substantially vertical plane from a substantially horizontal position within said well adjacent to said rear bumper to a substantially vertical position upstanding from said well so that said guide rod may be viewed by the driver of the vehicle and thereafter back to said horizontal position so that said guide rod may be disposed in said well.

2. A parking guide according to claim 1 wherein said guide rod is adapted to be flush with the top of said well when said guide rod is in its horizontal position.

3. A parking guide according to claim 1 wherein said guide rod is formed of a translucent material.

4. A parking guide according to claim 3 further comprising means for selectively illuminating substantially the entire length of said guide rod when said guide rod is in its vertical position.

5. A parking guide according to claim 4 wherein said guide rod is hollow, said guide rod further including a guide rod cap disposed at the end of said guide rod for reflecting light along the length of said guide rod.

6. A parking guide according to claim 4 wherein said means for moving said guide rod includes a motor and a linkage assembly responsive to said motor.

7. A parking guide according to claim 6 wherein said means for moving said guide rod further includes a wheel connected to said guide rod and to said linkage assembly, said wheel being rotated by said linkage assembly to move said guide rod from its horizontal position to its vertical position.

8. A parking guide according to claim 4 further comprising a housing located behind said rear bumper and beneath said trunk, said means for moving said guide rod and said means for selectively illuminating said guide rod both disposed within said housing.

9. A vehicle indicating mechanism for gauging the back of a vehicle comprising first and second parking guides; each parking guide including a guide rod, separate means for moving said guide rod in a substantially vertical plane from a substantially horizontal position adjacent to the rear bumper of the vehicle to a substantially vertical position extending upwardly relative to said rear bumper so that said guide rod may be viewed by the driver of the vehicle when said guide rod is in its vertical position, said moving means further moving said guide rod from said vertical position to said horizontal position, means for selectively illuminating substantially the entire length of said guide rod when said guide rod is in its vertical position; a well defined between said rear bumper of the vehicle and the trunk of the vehicle and adapted to receive the guide rod of said first parking guide and the guide rod of said second parking guide, said well open at the top thereof and including a bottom wall and side walls upstanding therefrom; said first parking guide located relative to said well so that when its guide rod is in the vertical position, the guide rod provides a gauge as to the rear left side of the vehicle; and said second parking guide located relative to said well so that when its guide rod is in the vertical position, the guide rod provides a gauge as to the rear right side of the vehicle.

10. A vehicle indicating mechanism according to claim 9 wherein the guide rod of said first parking guide and the guide rod of said second parking guide are in substantially common horizontal plane within said well when the guide rods are in their horizontal positions.

11. A vehicle indicating mechanism according to claim 10 wherein said common plane is substantially flush with the top of said well.

12. A vehicle indicating mechanism according to claim 9 wherein the guide rod of said first parking guide and the guide rod of said second parking guide are in a substantially common vertical plane within said well when the guide rods are in their horizontal positions.

13. A vehicle indicating mechanism according to claim 12 wherein the guide rod of said first parking guide is disposed above the guide rod of said second parking guide when the guide rods are in their horizontal positions.

14. A vehicle indicating mechanism according to claim 13 wherein the guide rod of said first parking guide is flush with the top of said well when the guide rods are in their horizontal positions.

15. A vehicle indicating mechanism according to claim 14 further comprising means for delaying movement of the guide rod of said second parking guide from its horizontal to its vertical position and for delaying movement of the guide rod of said first parking guide from its vertical to its horizontal position to coordinate movement of the guide rods out of and into said well.

16. A parking guide for gauging the back of a vehicle comprising a guide rod, a well adjacent the rear bumper of the vehicle and adapted to receive said guide rod, said well open at the top and including a bottom wall and side walls upstanding therefrom, means for moving said guide rod from substantially horizontal position within said well and adjacent to said rear bumper to a substantially vertical position upstanding from said well so that said guide rod may be viewed by the driver of the vehicle and back to said horizontal position so that said guide rod may be disposed in said well, said guide rod adapted to be flush with the top of said well when said guide rod is in its horizontal position, said means for moving said guide rod including a motor, a linkage assembly responsive to said motor and a wheel connected to said guide rod and to said linkage assembly, said wheel being rotated by said linkage assembly to move said guide rod between its horizontal and vertical positions.

* * * * *